March 7, 1961     B. T. QUIGLEY     2,973,669
TRANSMISSION
Filed July 11, 1957
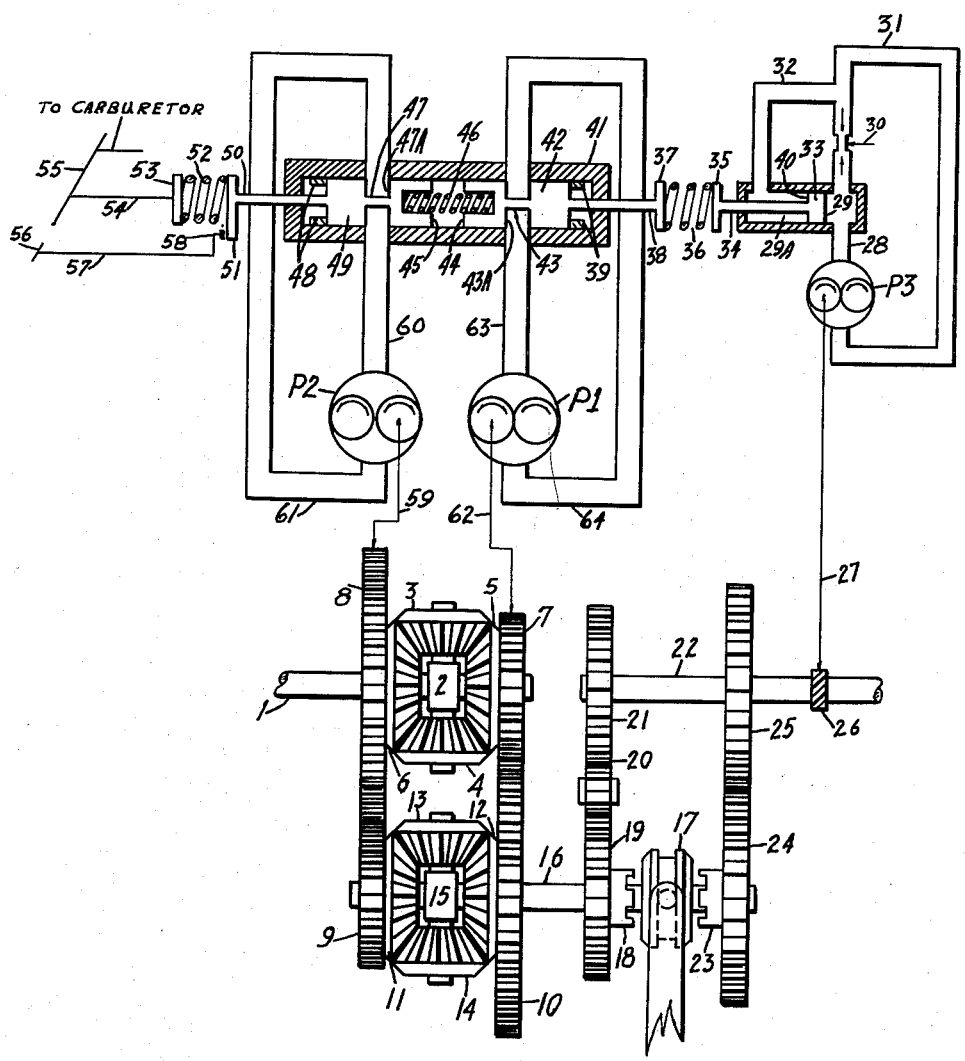
INVENTOR.
Bernard Thomas Quigley

United States Patent Office 2,973,669
Patented Mar. 7, 1961

2,973,669

TRANSMISSION

Bernard Thomas Quigley, 1878 Parker Blvd., Tonawanda, N.Y.

Filed July 11, 1957, Ser. No. 671,217

3 Claims. (Cl. 74—752)

The invention relates to a transmission of the automatic type and more particularly, to a controllable mechanism for transmitting power from a driving shaft to a driven shaft in variable gear ratios, primarily intended for use with, but not limited to, automotive vehicles.

In general, the invention employs the operative characteristics of uniquely interconnected differentials and associated control and speed responsive assemblies, which may be operatively combined with a suitable clutch and gear system arranged to selectively effect forward, reverse or neutral vehicular operation.

The single figure illustrates the instant automatic transmission unitarily adaptable for use in automotive vehicles, showing two uniquely interconnected differential sets operatively integrated with automatically actuated fluid control and speed responsive assemblies.

The instant construction includes a unique arrangement of two differentials of any suitable type, herein shown as of the bevel gear type, with a driving shaft 1 constantly interconnecting a suitable power source to an input spider 2. Spider pinion gears 3—4 are shown rotatably mounted on their respective spider pinion shafts and meshed with respective differential side gears 5 and 6. Side gears 5 and 6 are rigidly joined to end gears 7 and 8 respectively, rotatably mounted on shaft 1. End gear 7 is constantly meshed with end gear 10 in a suitable gear ratio, shown herein as low speed ratio. End gear 8 is constantly meshed with end gear 9 in a suitable gear ratio, shown herein as high speed ratio. End gears 9 and 10 are rigidly joined to side gears 11 and 12 respectively, rotatably mounted on driven shaft 16. Side gears 11 and 12 mesh with spider pinion gears 13 and 14, rotatably mounted on their respective spider pinion shafts. Output spider 15 is constantly connected to a driven shaft 16. In addition, end gear 7 is mechanically connected 62 to one rotor of fluid pump P1, and end gear 8 is mechanically connected 59 to one rotor of fluid pump P2.

The aforementioned fluid control assembly includes one rotor of a fluid pump P1 constantly connected 62 with end gear 7 so that pump P1 is in operation when end gear 7 is rotating. The fluid output of pump P1 may be directed, in either direction, through conduit 63, valve aperture 43A, recessed chamber 43 of multi-position control valve 42, and conduit 64. Valve 42, when actuated by an associated speed responsive mechanism, hereinafter described, will controllably vary aperture 43A and regulate the fluid output of pump P1, thereby effecting infinitely variable fluid resistance factors to react against the rotors of fluid pump P1 and modify the rotative characteristics of end gear 7 through mechanical connection 62, during normal operation. Similarly, one rotor of fluid pump P2 is constantly connected 59 with end gear 8 so that pump P2 is in operation when end gear 8 is rotating. The fluid output of pump P2 may be directed, in either direction, through conduit 60, valve aperture 47A, recessed chamber 47 of multi-position valve 49 and conduit 61. Valve 49, when actuated by a speed responsive mechanism, hereinafter described, will controllably vary aperture 47A and regulate the fluid output of pump P2, thereby effecting infinitely variable resistance factors to react against the rotors of pump P2 and modify the rotative characteristics of end gear 8 through mechanical connection 59 during normal operative conditions.

Multi-position control valves 42 and 49 may be of any suitable type, being shown herein as of a cylindrical nature and slidable axially within a valve block 41, maintained in operative relationship with associated accelerator, decelerator and speed responsive mechanisms by appropriate springs 36, 46 and 52. The arrangement being such that when the accelerator 55, decelerator 56 and speed responsive actuating mechanisms are inoperative, compression spring 46 acts to separate and hold valves 42 and 49 against their respective limiting stops 39 and 48, and when the accelerator 55, decelerator 56 and speed responsive mechanisms are actuated, in any operative combination, spring 46 may be compressed to permit abutment of valve end surfaces 44 and 45 so that valves 42 and 49 will become jointly operative.

The speed responsive mechanism may be of any suitable type, being shown herein as of a fluid pump type. The arrangement being such that one rotor of pump P3 is suitably connected 27 with gear 26 fixed on propeller shaft 22 so that pump P3 is in operation when propeller shaft 22 is rotating. When the vehicle is in operation, in a forward direction, the fluid output of pump P3 is directed through conduit 28, suitable fluid resistance aperture 30, herein shown as being of the variable resistance type, and conduit 31. Variations in vehicle forward speed will effect variations in fluid flow through aperture 30 and cause corresponsive fluid pressure variations against piston face 29 to effect longitudinal variations of movement of piston 33, slidable within cylinder 29A, and piston extension member 35. Longitudinal movement of piston extension member 35 will interact on spring 36 and valve extension 37 to effect longitudinal variations of movement of abutted valves 42 and 49, to control and regulate the flow of fluid through apertures 43A and 47A respectively, in accordance with vehicle speed. When the vehicle is in motion, in a reverse direction, the fluid output of pump P3 is directed through conduit 31, fluid resistance aperture 30 and conduit 28. Variations in vehicle reverse speed will cause variable pressures against piston face 40 so that no responsive controlling action of multi-position control valves 42 and 49 is effected and the transmission, in effect, will remain in a high reduction ratio of operation.

A linkage 54 arranged to be actuated by a conventional accelerator mechanism 55 is provided to effect longitudinal movement of member 53 and compress spring 52 thereby effecting longitudinal movement of multi-position valve 49, when the accelerator is actuated to increase or decrease engine speed.

A unique decelerator mechanism consisting of a heel rest 56, linkage 57 and member 58 provides a convenient means to retard vehicle motion, being arranged to controllably employ variable reduction ratios in conjunction with engine compression to retard and decelerate vehicle motion. The decelerator linkage is arranged to be actuated by pressure of the heel of the operator's foot, generally the right foot, independently of the accelerator mechanism.

A synchronizer 17, shown herein as of generally conventional design, is splined to and rotatable with shaft 16 and slidable longitudinally along the axis of shaft 16. Gear dog 18 is rigidly connected to gear 19 mounted for free rotation on shaft 16. Synchronizer 17 may be moved longitudinally by shifter fork 17A to engage a set of internal teeth (not shown) with gear dog 18 thereby clutching gear 19 to shaft 16. Gear 19 is in constant mesh with reverse idler gear 20 which is in constant mesh with gear 21, rigidly mounted on propeller shaft 22. In a similar manner, gear dog 23 is rigidly connected to gear 24 mounted for free rotation on shaft 16. Synchronizer 17 may be moved longitudinally to engage a second set of internal teeth (not shown) with gear dog 23 thereby clutching gear 24 to shaft 16. Gear 24 is in constant mesh with gear 25, rigidly mounted on propeller shaft 22. The aforementioned synchronizer and gear system arrangement is provided to selectively effect neutral, forward or reverse operative ranges.

In neutral, synchronizer 17 is disengaged from gear dogs 18 and 23 by shifter fork 17A. The power delivered to spider 2 will continue through the differentials causing shaft 16 and synchronizer 17 to rotate, but no driving torque will be imparted to propeller shaft 22 and the rear axle assembly. Aperture 43A will remain open to fluid flow to allow rotation of the rotors of pump P1.

In forward operating range, synchronizer 17 is positioned to engage gear dog 18. With the vehicle at rest and engine running at idling speed, valve apertures 43A and 47A remain open to fluid flow to allow free rotation of the rotors of pumps P1 and P2. Vehicle inertia will arrest rotation of driven shaft 16 and spider 15, so that engine idling torque delivered to spider 2 will cause rotation of: Spider pinion gears 3 and 4 on their respective pinion shafts, side gear 5 and end gear 7, end gear 10 and side gear 12, spider pinion gears 13 and 14, side gear 11 and end gear 9, end gear 8 and side gear 6; with gears 5 and 7 rotating in a direction opposite to that of gears 6 and 8, and with gears 10 and 12 rotating in a direction opposite to that of gears 9 and 11. Similarly, the rotors of pump P1, rotated by gear 7 through connection 62, rotate in a direction opposite to that of the rotors of pump P2, rotated by gear 8 through connection 59, so that, in effect, the transmission is in neutral operation. To effect vehicular motion, accelerator 55 is depressed to increase engine speed and simultaneously actuate linkage 54 to compress spring 52 and effect longitudinal movement of valve 49, thereby compressing spring 46 to permit abutment of valves 49 and 42 at surfaces 45 and 44 and closing aperture 47A to block fluid flow through pump P2 and conduits 60 and 61, with aperture 43A remaining open to allow free operation of pump P1. With aperture 47A closed, fluid resistance will arrest rotation of the rotors of pump P2 and coupling 59, end gear 8 and side gear 6, end gear 9 and side gear 11, so that the power flow will rotate spider 2 and cause spider pinion gears 3 and 4 to rotate on their respective pinion shafts and roll around stationary side gear 6, imparting torque to gears 5 and 7. Gear 7 will drive end gear 10 in a low speed ratio and rotate side gear 12 causing spider pinion gears 13 and 14 to rotate on their respective pinions shafts and roll around stationary side gear 11, imparting driving torque to spider 15 and driven shaft 16. The power flow will continue from shaft 16 through synchronizer 17 and suitable gear train engagement to the propeller shaft 22 and rear axle assembly, thereby overcoming vehicle inertia and imparting motion thereto. The transmission, in effect, operating in a low speed range. As vehicle speed increases, the controlling action of the speed responsive device is such as to progressively compress spring 36 and modify the action of spring 52, thereby effecting longitudinal movement of abutted valves 42 and 49 to progressively vary apertures 43A and 47A and corresponsively vary the fluid resistance against the rotors of pumps P1 and P2. The arrangement being such as to increase fluid resistance against the rotors of pump P1 and simultaneously decrease the fluid resistance against the rotors of pump P2. The resultant fluid resistance factors will cause rotational variations of the rotors of pumps P1 and P2 which, in turn, effect rotational variations of end gears 7 and 8 through connections 62 and 59 respectively, in a manner which causes gears 7 and 8 to rotate in the same direction and progressively decrease the angular velocity of gear 7, while progressively increasing the angular velocity of gear 8. The power flow output of gears 7 and 8 will be modified, in accordance with the controlling action of the fluid control assembly, in conjunction with appropriate ratio gear trains 8—9 and 7—10 to drive side gears 11 and 12 in the same direction in a manner that will progressively decrease the angular velocity of gear 12 and simultaneously increase the angular velocity of gear 11. The modified power flow delivered to side gears 11 and 12 will combine, by the operative characteristics of differentials, to rotate spider 15 and driven shaft 16 in a manner capable of effecting vehicle speeds ranging from low through intermediate and high, in infinitely variable and continuous progression, corresponsive to the variable torque and load to which the driving and driven shafts are subjected.

To employ high reduction ratios, during other than normal operating periods, increased depression of the accelerator, effected to increase engine speed, will simultaneously increase the compression of springs 52 and 36 to modify the controlling action of the speed responsive device, thereby re-positioning abutted valves 42 and 49 to effect modified fluid control pressures and speed ratios. The arrangement is such as to effect higher reduction ratios to satisfy the existing operating requirements.

To actuate the decelerator mechanism, under operative conditions, the operator releases the foot accelerator and controllably depresses the decelerator heel rest member 56 to actuate linkage 57, causing abutment of member 58 with valve extension member 51 and imparting longitudinal movement to valves 49 and 42, held in abutment by the controlling action of the speed responsive device. The controlled longitudinal movement of valves 49 and 42, as effected by decelerator action, is intended to overcome the controlling action of the speed responsive device and vary, simultaneously, the apertures of ports 43A and 47A. The controlled variations of apertures 43A and 47A cause corresponsive fluid pressure reactance against the rotors of pumps P1 and P2, being arranged to increase the resistance against the rotors of pump P2 and simultaneously decrease the resistance against the rotors of pump P1. The aforementioned fluid pressure variations cause corresponsive rotational variations of the rotors of pumps P1 and P2 which, through respective couplings 62 and 59, effect rotational variations of end gears 7—10 and 8—9. The resultant rotational variations of gears 7—10 and 8—9 will be modified, by the operative characteristics of differentials, to effect higher reduction ratios which are employed in conjunction with engine compression to operatively retard and decelerate vehicular motion.

In reverse operating position, synchronizer 17 is positioned to engage gear dog 23. Operatively, the transmission is arranged to be actuated as previously described for forward motion, except that the power flow delivered to shaft 16 will continue through gears 24 and 25 to rotate propeller shaft 22 in a direction opposite to that for forward vehicular motion, and the speed responsive device effects no controlling variations of valves 42 and 49 so that, the transmission will operate in a high reduction ratio.

It is to be understood that the invention is not limited in application, to the arrangement of parts and details of construction, as illustrated in the appended drawing. Further, the terminology, nomenclature and phraseology employed herein, is for the purpose of description and not limitation.

I claim as new and desire to secure by Letters Patent:

1. In a variable ratio transmission, a driving differential gear set, a driving shaft arranged to drivingly connect a power source to said differential gear set, a driven differential gear set, a driven shaft arranged to connect said driven differential gear set to a selectively directional gearing system, said directional gearing system to be suitably located to transmit power flow from said driven shaft to a propeller shaft, each differential gear set to include a first and a second side gear, an end gear train drivingly connecting said first side gears of said differential gear sets, a second end gear train drivingly connecting said second side gears of said differential gear sets, a plurality of fluid pumps, an impeller set of a first of said fluid pumps operatively connected to said first end gear train, an impeller set of a second of said fluid pumps operatively connected to said second end gear train, each impeller set to be actuated when its associated end gear train is in operation, each fluid pump to include an associated fluid circuit, means to regulate fluid flow in said fluid circuits.

2. In a variable ratio transmission, the structure of claim 1 wherein the said means to regulate fluid flow in in the respective fluid circuits includes a plurality of multi-position control valves, each valve to regulate fluid flow in its associated fluid circuit, a plurality of springs arranged to maintain said valves in operative relationship, associated accelerator and speed responsive operating means arranged to actuate said valves in suitable operative combination, a first of said springs suitably arranged to exert resilient action equally on one side of each of the said valves, a second spring one end of which bears against a second side of a first of said valves, a second end of said second spring to bear against an accelerator operating means, a third spring one end of which bears against a second side of a second of said valves, a second end of said third spring to bear against a speed responsive operating means, said second and third springs arranged to oppose the action of said first spring, also, said second and third springs arranged to be resiliently opposed, the resilient strength of said second and third springs being equal, and greater than that of the said first spring, the adjustment of said springs being such that when the accelerator and speed responsive actuating means are inoperative the said valves will be disjoined and held in separation, and when the accelerator and speed responsive operating means are actuated in any operable combination said first spring will permit abutment of said valves to effect jointly operative valve action.

3. In a variable ratio transmission, the structure of claim 2 wherein the said speed responsive operating means includes a fluid pump operatively connected to a propeller shaft, a fluid circuit operatively associated with said pump, the flow of fluid through said pump and fluid circuit to be directly and uniformly responsive to rotational variations of said propeller shaft, said fluid circuit to include a suitable resistance aperture, and a movable piston means, said movable piston means to be uniformly responsive throughout its normal operative range to fluid pressure variations as effected in said fluid circuit, an extension member of said movable piston arranged to bear against a second end of said third spring, said movable piston extension member arranged to operatively interact on said third spring when the vehicle is in motion in a forward direction.

References Cited in the file of this patent

UNITED STATES PATENTS

| | | |
|---|---|---|
| 2,181,118 | Burner | Nov. 28, 1939 |
| 2,223,716 | Bojesen | Dec. 3, 1940 |
| 2,580,449 | Maat | Jan. 1, 1952 |
| 2,653,487 | Martin et al. | Sept. 29, 1953 |
| 2,665,596 | Varble | Jan. 12, 1954 |

FOREIGN PATENTS

| | | |
|---|---|---|
| 434,934 | France | Dec. 11, 1911 |
| 538,645 | Italy | Jan. 28, 1956 |